J. RIDDELL.
MILLING ATTACHMENT FOR BUCKET CUTTING MACHINES.
APPLICATION FILED AUG. 6, 1906.
970,554.
Patented Sept. 20, 1910.
2 SHEETS—SHEET 2.
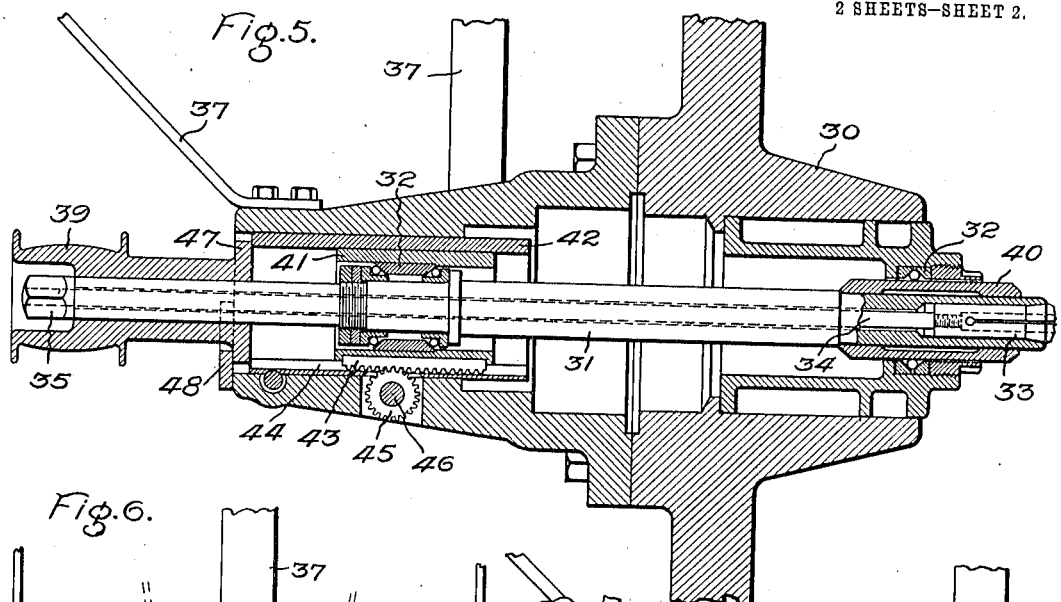
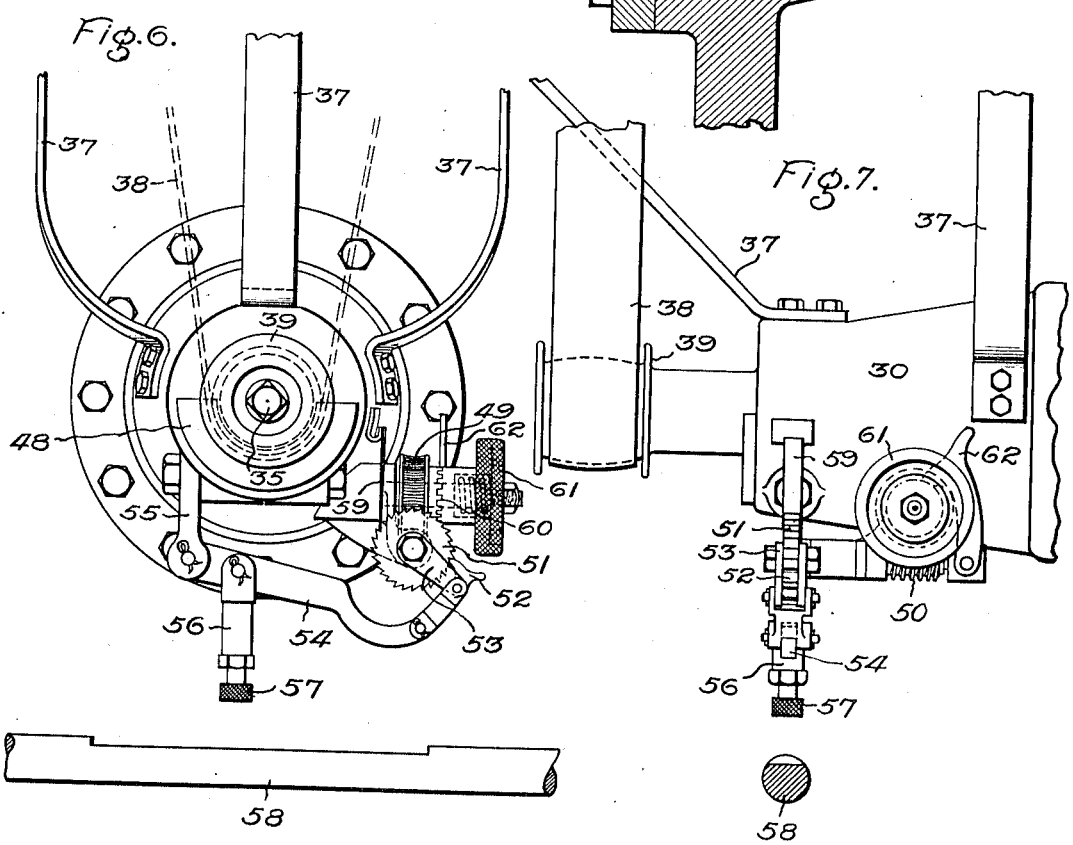
Witnesses:
Inventor;
John Riddell,
By Albert G. Davis
Atty.

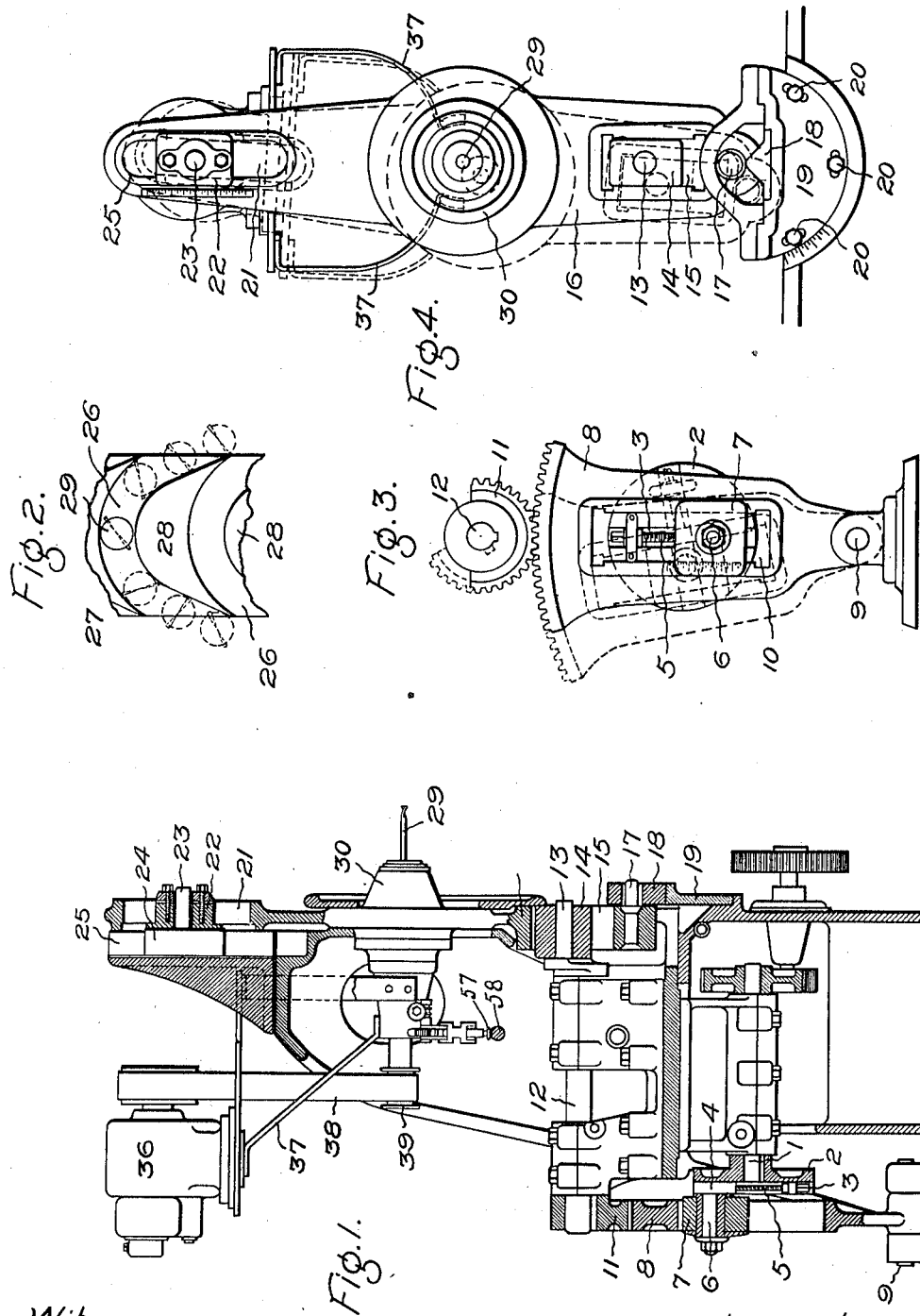

UNITED STATES PATENT OFFICE.

JOHN RIDDELL, OF SCHENECTADY, NEW YORK, ASSIGNOR TO GENERAL ELECTRIC COMPANY, A CORPORATION OF NEW YORK.

MILLING ATTACHMENT FOR BUCKET-CUTTING MACHINES.

970,554.

Specification of Letters Patent. Patented Sept. 20, 1910.

Application filed August 6, 1906. Serial No. 329,310.

*To all whom it may concern:*

Be it known that I, JOHN RIDDELL, a citizen of the United States, residing at Schenectady, county of Schenectady, State of New York, have invented certain new and useful Improvements in Milling Attachments for Bucket-Cutting Machines, of which the following is a specification.

This invention relates to machines for milling curved grooves in solid metal stock, and has especial reference to the formation of buckets for elastic fluid turbines by milling out the steam passages in the edge of a wheel or a segmental rim therefor, leaving the buckets integral with said wheel or segment. In a pending application, I have shown and described a machine for doing this work by means of a cutting tool which is oscillated back and forth in a curved path, being mounted on a rocking and reciprocating frame to which suitable movement is imparted by a crank and a stationary cam. In the present invention, I employ the same rocking and reciprocating frame, with its actuating crank and cam, but I substitute for the cutting tool a rotating routing tool, constantly driven by suitable means, so that it cuts on the backward stroke as well as on the forward stroke. At the end of each stroke the tool is fed automatically. It is driven preferably by an electric motor supported on the rocking and reciprocating frame.

In the accompanying drawings, Figure 1 is a sectional elevation of my improved machine; Fig. 2 shows a piece of a bucket-segment and illustrates the path of the tool; Fig. 3 is a front view of the segment gear and pinion; Fig. 4 is a front elevation of the rocking and reciprocating frame and its cam; Fig. 5 is a longitudinal section of the tool-carrying head; Fig. 6 is a rear elevation of the same; and Fig. 7 is a side elevation of the rear portion thereof.

The essential parts of the operating mechanism are shown in Figs. 1, 3 and 4. A shaft 1 carries a disk 2 having a diametrical slot 3 in which slides a block 4 adjustable by means of a screw 5 and carrying a crank pin 6 which is journaled in a block 7. A segment gear 8 is centered at 9 and has a radial slot 10 in which the block 7 can move lengthwise, so that when the shaft 1 is rotated the gear will be rocked from side to side, the amount of angular movement depending upon the adjustment of the crank pin and its consequent throw. The segment gear meshes with a pinion 11, preferably a segmental one, keyed to a shaft 12 which has at one end a crank 13 journaled in a block 14 which slides in a slot 15 in the lower end of the rocking and reciprocating frame 16. A guide pin 17 projects laterally from this end of the frame and engages with a cam 18 in a plate 19 which is angularly adjustable, as by means of bolts 20 passing through slots into the frame of the machine. The center of angular movement of the plate is the peak of the cam 18, and said cam is removable so that different ones may be used to effect various resultant motions of the rocking and reciprocating frame as it is swung to and fro by the rotation of the crank 13. The upper end of this frame has a longitudinal slot 21 receiving a block 22 which is pivoted on a pin 23 projecting from a slide 24 which is capable of adjustment by any suitable means in upright guideways 25 in the upper part of the frame of the machine. The frame 16 is thus given a swinging or rocking movement from side to side, pivoting on the pin 23, and at the same time it has a rising and falling or reciprocating motion due to the cam 18 over which the pin 17 rides back and forth. In other words, assuming the guide-pin 17 to be in the bottom of the cam-slot, the pin will first ride up the cam, pass the point and ride down the other side. To complete the cycle the reverse operation takes place until the pin reaches the initial position. During the first part of the cycle the cutting tool has been caused to pass through the work from one side to the other, and during the second part of the cycle to return to the point of starting, both parts of the cycle being cutting operations. During this cycle the guides carried by the machine frame or standard confine the movements of the rocking and reciprocating frame or member 16 to one plane, i. e., a vertical plane perpendicular to the base of the standard. It is to be noted that the said member is reciprocated twice during each cycle of operation, and that the said member is positively swung forward and back for each cycle. These actions must be accurately determined and provided for, because the shape and size of the finished buckets have a direct bearing on the efficiency of the turbine for which the buckets are intended. The object of this complex movement is to impart to the routing tool the proper motion to cut the curved grooves 26 in a bucket wheel or segment 27, leaving the integral crescent-shaped buckets 28 spaced at equal distances apart. To effect this result, the tool 29 is mounted in a head 30, attached to or integral with the frame 16. This head is tubular, its axis being perpendicular to the plane in which the frame 16 moves. A spindle 31 passes longitudinally through said head, being journaled preferably in ball bearings 32 at each end of the head. The spindle itself is tubular, and its front end is counterbored to receive the jaws of a chuck 33 in which the routing tool 29 is held with its axis in line with that of the spindle. The chuck is operated by a rod 34 running through the tubular spindle and adjustable by means of a nut 35 at its rear end. The spindle is rotated by an electric motor 36 which is preferably supported on brackets 37 bolted to the head 30, so that the motor moves with the head and maintains a fixed relation to the spindle, to which it is connected by a belt 38 running over a pulley 39 on the rear end of said spindle.

In order to feed the tool to the work, the spindle is movable lengthwise in the head. At its front end it is provided with a long journal, preferably composed of a sleeve 40, capable of sliding through the stationary ball bearing. At its rear end, the ball bearing is mounted in a sleeve 41 adapted to slide lengthwise in a stationary bushing 42, and provided with a longitudinal rack 43 located in a groove 44 in said bushing and meshing with a pinion 45 on a transverse shaft 46 suitably journaled in the head 30. By turning said shaft, the sleeve 41 can be slid to and fro carrying with it the spindle and tool. The pulley 39 is preferably splined to the spindle so as not to partake of its longitudinal motions. It is retained in place by a flange 47 held by a plate 48 against the end of the bushing 42.

For the purpose of rotating the shaft 46 in order to feed the tool, said shaft is preferably provided with a worm wheel 49 meshing with a worm 50 mounted on a short shaft which carries a ratchet wheel 51. A pawl 52 is held in engagement with the ratchet wheel by radius links 53, being carried by a lever 54 fulcrumed in a hanger 55 and provided with a pivoted leg 56 which has an adjustable foot 57. Located below said foot is a stationary bar 58 upon which the foot rests at each downward movement of the frame 16, that is, at each end of a stroke of the tool. As the foot strikes the bar before the frame 16 completes its downward movement, the lever 54 will be lifted with reference to the head 30, and the pawl 52 will turn the ratchet wheel a tooth or two and consequently the tool spindle will be moved forward. A detent 59 prevents any backward movement of the ratchet wheel when the lever drops on the upward movement of the frame 16.

To provide for running back the spindle and for making quick adjustments thereof by hand, the worm gear 49 is preferably loose on the shaft 46 and is connected thereto by a clutch 60 held in engagement by an internal spring, shown in dotted lines. When the handwheel 61 is pulled back to disengage the clutch and leave the shaft 46 free to be turned by the hand wheel, the blade 62 can be dropped in between the teeth of the clutch to prevent it from closing until the hand adjustment has been completed.

The operation of the machine is briefly as follows: The tool 29 is constantly rotated by the motor at a high rate of speed, preferably about 6000 revolutions per minute. The rocking and reciprocating frame carries the tool in a curved path proper to cut the grooves or steam passages in the bucket wheel or segment and leave the buckets integral therewith. At each end of the stroke the tool is fed forward automatically, and as the cutting is effected during every passage of the tool through the groove in either direction, the operation of forming the buckets is very rapid; the high rate of rotation producing a smooth and finished surface.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is:

1. In a bucket-cutting machine, the combination of a standard, a member mounted thereon, means for reciprocating the member twice during each cycle of operation, means for positively swinging the member forward and back for each cycle of operation, the said reciprocating and swinging movements taking place simultaneously and defining the path of the tool, guides restricting said movements of the member to one plane, a continuously rotating cutting tool mounted on and moving with the member, and a device actuated by said member for feeding the tool toward the work adjacent the end of the path of said tool.

2. In a bucket-cutting machine, the combination of a standard, a member mounted thereon, means for reciprocating the member twice during each cycle of operation, means for positively swinging the member forward and back for each cycle of operation, the said reciprocating and swinging movements taking place simultaneously and defining the path of the tool, guides restricting the said movements of the member to one plane, a cutting spindle carried by the member whose axis is perpendicular to the plane of movement of the member, means for continuously rotating the spindle, and a device actuated by said member for feeding the spindle forward adjacent each end of the path of said cutting spindle or tool.

3. In a bucket-cutting machine, the combination of a standard, a member mounted thereon, means for reciprocating the member twice during each cycle of operation, means for positively swinging the member, the said reciprocating and swinging movements taking place simultaneously and defining the path of the tool, guides confining the said movements to one plane, a cutting tool carried by the member and extending perpendicular to the plane of movement thereof, a motor supported by and moving with the member that is connected to the tool for continuously rotating it, and a device actuated by said member for feeding the tool forward adjacent each end of the path of said tool.

4. In a bucket-cutting machine, the combination of a standard, a member mounted thereon, means for reciprocating the member twice during each cycle of operation, means for positively swinging the member, the said reciprocating and swinging movements taking place simultaneously and defining the path of the tool, guides restricting the said movements of the member to one plane, a cutting tool carried by the member and extending perpendicular to the plane thereof, a motor supported by and moving with said member, a driving connection between the moving element of the motor and the tool, and a device actuated by the reciprocating movements of said member for feeding the tool toward the work adjacent each end of the path of said tool.

5. In a bucket-cutting machine, the combination of a standard, a member mounted thereon, means for positively reciprocating the member twice during each cycle of operation, means for positively swinging the member forward and back for each cycle of operation, the said reciprocating and swinging movements taking place simultaneously and defining the path of the tool, guides restricting the said movements of the member to one plane, a head carried by the member, a tool spindle mounted in the head and movable longitudinally therein, a belt pulley splined to the spindle for rotating the same without retarding its longitudinal movements, a motor supported on said head and belted to the pulley, and a device actuated by the reciprocating movement of said member for feeding the tool spindle forward adjacent each end of the path of the tool.

6. In a bucket-cutting machine, the combination of a standard, a member mounted thereon, means for reciprocating the member twice during each cycle of operation, means for positively swinging the member forward and back for each cycle of operation, the said reciprocating and swinging movements taking place simultaneously and defining the path of the tool, guides restricting said movements of the member to one plane, a head carried by the member, a tool spindle mounted in the head at right angles to said plane and movable longitudinally in said head, bearings for said spindle, means for continuously rotating the spindle, and a device actuated by said member for feeding the tool spindle longitudinally, adjacent the end of the path of the tool.

7. In a bucket-cutting machine, the combination with a rocking and reciprocating frame, of a tubular head carried thereby, a tool spindle in said head, a stationary ball bearing through which the front end of said spindle can slide, and a ball bearing sliding with the rear end of said spindle.

8. In a bucket-cutting machine, the combination with a rocking and reciprocating frame, of a tubular head carried thereby, a tool spindle in said head, a stationary bearing for the front end of said spindle, a sleeve-supported bearing for the rear end of said spindle, and means for moving said sleeve longitudinally.

9. In a bucket-cutting machine, the combination with a rocking and reciprocating frame, of a tubular head carried thereby, a tool spindle in said head, a stationary bearing for the front end of said spindle, a sleeve-supported bearing for the rear end of said spindle, means for moving said sleeve longitudinally, and means for automatically actuating said sleeve-moving means at each downward movement of said frame.

10. In a bucket-cutting machine, the combination with a rocking and reciprocating frame, of a tubular head carried thereby, a tool spindle in said head, a sleeve supported bearing for the spindle, and means for moving said sleeve longitudinally, comprising a lever, and a stationary bar adapted to arrest said lever at a given point in the movement of said frame.

11. In a bucket cutting machine, the combination of a frame, means for rocking and reciprocating the frame, a tool carrying spindle mounted on the frame, and means for feeding the spindle longitudinally comprising a pawl and ratchet mechanism carried by the frame, a lever for operating said mechanism that is mounted on the frame, and a stationary abutment which engages and moves the lever to actuate said mechanism on each movement of the frame toward said abutment.

In witness whereof, I have hereunto set my hand this fourth day of August, 1906.

JOHN RIDDELL.

Witnesses:
EDWARD WILLIAMS, Jr.,
BENJAMIN B. HULL.